United States Patent [19]
Horowitz

[11] 3,960,365
[45] June 1, 1976

[54] GLADHAND WITH SHUTOFF COCK
[75] Inventor: Charles Horowitz, Niles, Ill.
[73] Assignee: Sloan Valve Company, Franklin Park, Ill.
[22] Filed: May 7, 1975
[21] Appl. No.: 575,467

[52] U.S. Cl. .............................. 251/286; 285/69; 251/174
[51] Int. Cl.² .................................... F16K 51/00
[58] Field of Search ............... 285/68, 69; 251/174, 251/192, 286, 287, 288

[56] References Cited
UNITED STATES PATENTS

| | | | |
|---|---|---|---|
| 1,090,453 | 3/1914 | Cole | 285/69 X |
| 2,511,477 | 6/1950 | Mueller | 251/286 X |
| 3,184,212 | 5/1965 | Billeter | 251/174 X |

Primary Examiner—Henry T. Klinksiek
Attorney, Agent, or Firm—Kinzer, Plyer, Dorn & McEachran

[57] ABSTRACT

A gladhand construction is combined with a shutoff cock and means for mounting the combination to a trailer body. A fitting is positioned within a passage of the gladhand body for use in making a connection with a conduit on the trailer and there is a spring-biased bushing intermediate the fitting and shutoff cock for forming a seal therebetween.

10 Claims, 3 Drawing Figures

GLADHAND WITH SHUTOFF COCK

SUMMARY OF THE INVENTION

The present invention relates to a combination gladhand and shutoff cock and has particular relation to such a structure which is mounted on a trailer.

A primary purpose is a combination structure of the type described which includes a mounting bracket for attaching the body to a trailer, as well as a fitting for connecting to a typical tubing or conduit on the trailer.

Another purpose is a simply constructed reliably operable combination gladhand and shutoff cock.

Another purpose is a unit of the type described which is usable at the rear of a trailer which will be directly connected to a second trailer.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
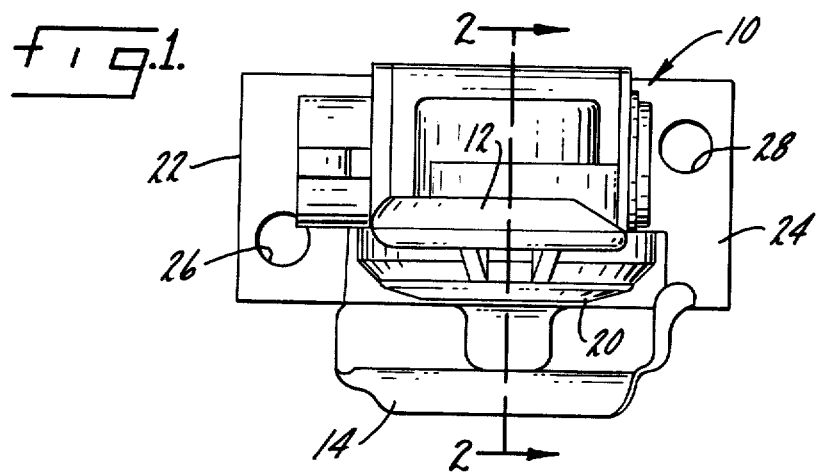
FIG. 1 is a plan view of a combination structure of the type described.

The particular combination gladhand and shutoff cock disclosed herein has application in the trucking field and particularly at the rear of a trailer which will pull a second trailer.

A gladhand body 10 has a first camming surface 12 and a second camming surface 14, both of which are conventional and are used to connect with similar surfaces of an opposing gladhand body. The body 10 has an air chamber 16 with an outlet port 18 surrounded by a conventional gladhand seal member 20.

At one end of the body 10 are mounting flanges 22 and 24 having mounting holes 26 and 28 which are used to attach the gladhand structure directly to a trailer.

There is a passage 30 connecting air outlet chamber 16 and an air inlet 32 which is formed in surface 34 defined by flanges 22 and 24. Positioned within passage 30 is a fitting 36 and a bushing 38. Positioned adjacent the bushing and between bushing 38 and chamber 16 is a shutoff cock or valve member 40.

Looking specifically at fitting 36, it is held in position within passage 30 by a ring 42 which holds a flange portion 44 of fitting 36 against a shoulder 46. An O-ring seal 48 seals the exterior of the fitting with the interior of passage 30.

Fitting 36 has an outwardly-extending tubular portion 50 which threadedly mounts an adjusting nut 52. Positioned between the outward end 54 of tubular portion 50 and a corresponding surface 56 on nut 52 is a compression member 58. The compression member and nut 52 are used in the conventional manner to attach the tubular portion 50 to a conduit, tube or the like on the trailer.

Valve member 40 has a ball-shaped portion 60 with a passage 62 extending therethrough. At one side of the ball-shaped portion 60 the valve member has a cylindrical portion 64 which fits within a bore 66 in the body 10. Rings 68 and 70 cooperate to hold valve member 40 within body 10. An O-ring 72 may form an effective seal between the valve member 40 and bore 66.

At the opposite side of valve member 40 there is a similar cylindrical portion 74, sealed by an O-ring 76 to bore 66 and having a stem 78 extending outwardly from the body. A handle 80 is attached to the stem 78 for use in rotating the valve member.

Figure 2:
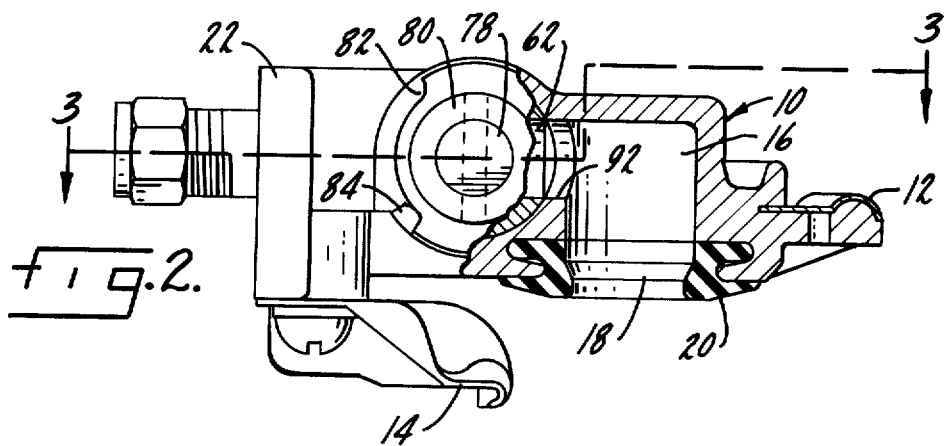
FIG. 2 is a section along plane 2—2 of FIG. 1.
Figure 3:
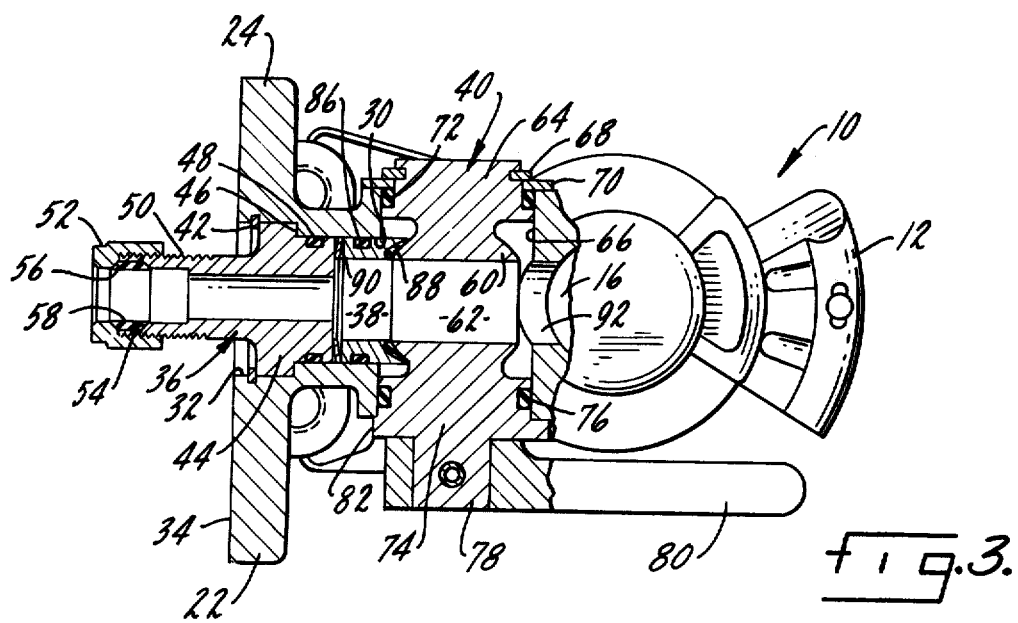
FIG. 3 is a section along plane 3—3 of FIG. 2.

As shown particularly in FIG. 2, there may be a recess 82 in the surface of cylindrical portion 74 which faces body 10 and a key 84 extending into the recess and integral with body 10. Key 84 in cooperation with the limited arcuate extent of recess 82 is effective to limit rotational movement of the shutoff cock or valve member 40.

Bushing 38 carries an O-ring seal 86 which seals against passage 30 and a generally spherical seal member 88 which seals against the inlet side of ball-shaped portion 60 of valve member 40. A wave washer or spring 90, positioned between fitting 36 and bushing 38, urges bushing 38 and seal 88 toward and into contact with ball-shaped portion 60 of valve member 40.

Body 10 includes a passage 92 which connects chamber 16 with cylindrical bore 66 which rotatably mounts valve member 40. Thus, when the valve is in the position shown, gladhand chamber 16 is connected, through passage 92, passage 62 in valve member 40, bushing 38 and fitting 36 with a conduit which can be attached by means of the tubular extension 50 of the fitting. When it is desired to shut off the flow of air into chamber 16, handle 80 is rotated through its limited arcuate extent permitted by the combination of recess 82 and stop 84. I have not shown the opposing portion of the gladhand construction which may be similar in configuration to the body 10 either with or without a shutoff cock. In any event, such gladhand construction will have the camming surfaces 12 and 14, as well as the seal 20.

Of particular advantage is the fact that in former constructions designed to serve somewhat the same purpose as the present device, there were separate gladhands, shutoff cocks, mounting brackets and fittings. The present invention has combined all such elements into a single integral reliably operable structure. The fitting is positioned within a passage in the gladhand body and is effective to provide a base for urging the bushing toward the shutoff cock to form a seal therewith. The fitting itself may be attached through a conventional compression member to the conduit on the trailer. The gladhand will be connected in the normal manner to its opposing element. The entire structure can be conveniently mounted through mounting flanges and cooperating openings for receiving bolts, screws or the like which will attach the structure to the trailer body.

Whereas the preferred form of the invention has been shown and described herein, it should be realized that there may be many modifications, substitutions and alterations thereto.

The embodiments of the invention in which an exclusive property or privilege is claimed are defined as follows:

1. In a combination gladhand and shutoff cock, a gladhand body, mounting means formed on said body, an air chamber in said body and an outlet therefor, seal means surrounding said gladhand body air outlet, passage means connecting said chamber and said mounting means, a fitting positioned within said passage means and having an end extending outwardly from said body and mounting means, said outward end of said fitting including means for connecting said fitting to a conduit, a rotatable valve member positioned in said passage means intermediate said fitting and chamber, and a handle for said valve member positioned exteriorly of said body.

2. The structure of claim 1 further characterized by and including a bushing positioned within said passage means intermediate said fitting and valve member, and means urging said bushing into sealing contact with said valve member.

3. The structure of claim 2 further characterized by and including a seal between said bushing and valve member, and a spring positioned between said bushing and fitting urging said bushing into sealing contact with said valve member.

4. The structure of claim 1 further characterized in that said fitting includes an adjustable nut and a compression member positioned intermediate said nut and the outward end of said fitting for use in attaching said fitting to a conduit.

5. The structure of claim 1 further characterized in that said valve member includes a ball-like portion having a passage extending therethrough, and means for forming a seal about the exterior of said ball-like portion passage on the inlet side thereof.

6. The structure of claim 5 further characterized in that said means for sealing includes a bushing positioned between said fitting and said ball-like portion, said bushing carrying a seal member in sealing contact with said ball-like member about its passage inlet.

7. The structure of claim 6 further characterized by and including spring means urging said bushing toward said ball-like portion and said seal member into sealing contact therewith.

8. The structure of claim 7 further characterized in that said spring means includes a washer-type spring positioned between said bushing and fitting.

9. The structure of claim 1 further characterized by and including cooperating stop means on said body and valve member for limiting rotation of said valve member.

10. The structure of claim 9 further characterized in that said stop means includes a recess on said valve member and a cooperating key on said body.

* * * * *